United States Patent
Rothschild et al.

(10) Patent No.: US 10,785,166 B1
(45) Date of Patent: Sep. 22, 2020

(54) RESOURCE ASSIGNMENT PROTOCOL-IMPLEMENTED POLICY-BASED DIRECTION OF A CLIENT TO AN EDGE-COMPUTE RESOURCE

(71) Applicant: Cox Communications, Inc., Atlanta, GA (US)

(72) Inventors: Keith Alan Rothschild, Dunwoody, GA (US); Dipan Patel, Atlanta, GA (US); Ron Lev, Atlanta, GA (US); Steve Malenfant, Cumming, GA (US)

(73) Assignee: COX COMMUNICATIONS, INC., Atlanta, GA (US)

( * ) Notice: Subject to any disclaimer, the term of this patent is extended or adjusted under 35 U.S.C. 154(b) by 102 days.

(21) Appl. No.: 16/204,410

(22) Filed: Nov. 29, 2018

(51) Int. Cl.
*G06F 15/16* (2006.01)
*H04L 12/927* (2013.01)
*H04L 12/851* (2013.01)
*H04L 12/24* (2006.01)
*H04L 29/08* (2006.01)
*H04L 29/12* (2006.01)

(52) U.S. Cl.
CPC ........ *H04L 47/805* (2013.01); *H04L 41/0823* (2013.01); *H04L 47/24* (2013.01); *H04L 47/801* (2013.01); *H04L 67/1008* (2013.01); *H04L 67/2814* (2013.01); *H04L 67/32* (2013.01); *H04L 61/1511* (2013.01); *H04L 61/2015* (2013.01)

(58) Field of Classification Search
CPC ... H04L 47/805; H04L 41/0823; H04L 47/24; H04L 47/801; H04L 67/1008; H04L 67/2814; H04L 67/32; H04L 61/1511; H04L 61/2015
See application file for complete search history.

(56) References Cited

U.S. PATENT DOCUMENTS

| | | | | |
|---|---|---|---|---|
| 7,698,388 B2 * | 4/2010 | Hoover | ............... | G06F 21/6218 709/219 |
| 8,090,827 B2 * | 1/2012 | Hoover | ............... | G06F 21/6218 709/225 |
| 8,291,044 B2 * | 10/2012 | Storrie | .................... | H04L 67/16 709/217 |
| 8,738,741 B2 * | 5/2014 | Storrie | .................... | H04L 67/16 709/217 |
| 8,910,270 B2 * | 12/2014 | Nice | .................. | H04L 63/0281 726/14 |
| 9,088,560 B1 * | 7/2015 | Newstadt | .............. | H04L 63/083 |
| 9,407,456 B2 * | 8/2016 | Hoover | ............... | G06F 21/6218 |

(Continued)

*Primary Examiner* — Moustafa M Meky
(74) *Attorney, Agent, or Firm* — Merchant & Gould

(57) ABSTRACT

Aspects of the present disclosure provide a technical improvement to the problem of network congestion that exists when providing online services to clients. A system, method, and computer readable storage device use a resource assignment protocol to direct client requests for content and remote processing to a dynamic edge-compute instance placed in proximity to the client, thereby improving the Quality of Service QoS of network traffic. A policy server is implemented for serving specific clients with specific dynamically-placed services. Accordingly, traditional network traffic associated with communicating with a remote resource server and computational demand on the remote resource server are reduced, thereby making the network more efficient.

20 Claims, 7 Drawing Sheets

(56) References Cited

U.S. PATENT DOCUMENTS

| | | | |
|---|---|---|---|
| 10,135,827 B2* | 11/2018 | Hoover | G06F 21/6218 |
| 10,511,507 B2* | 12/2019 | Attarwala | H04L 45/302 |
| 10,636,074 B1* | 4/2020 | Bentley | G06Q 30/0633 |
| 2014/0344460 A1* | 11/2014 | Storrie | H04L 47/70 709/226 |
| 2017/0353496 A1* | 12/2017 | Pai | H04L 12/4641 |
| 2020/0128051 A1* | 4/2020 | Sondhi | H04L 51/34 |

* cited by examiner

RESOURCE ASSIGNMENT PROTOCOL-IMPLEMENTED POLICY-BASED DIRECTION OF A CLIENT TO AN EDGE-COMPUTE RESOURCE

BACKGROUND

Being able to efficiently deliver network content and services reliably at a faster speed is a technical problem that exists when providing online services to clients. Consider, for example, the stress placed on a server providing a popular online service, such as video content, a smart doorbell service, a real-time or near real-time online application, etc., to clients, especially during peak times. The stress may be due in part to a large number of concurrently-active client connections at a given time and/or in part to the volume of data being uploaded to, processed by, and delivered from the server in its surrounding network.

As more computer users utilize online services and consume rich online media content, the more congested networks are becoming, which can have a negative effect on the delivery and performance of online services. Network congestion in data networking can be described as a reduction of quality of service that can occur when a network node or link is carrying more data than it can handle. Typical effects of network congestion include queueing delay, jitter, packet loss, or lag. When running a cloud application, streaming service, online game, VoIP (Voice over Internet Protocol) service, home security service, or other online service, symptoms of network congestion can be experienced as pixelated video, delayed/frozen video, choppy audio, VoIP echo, etc.

One solution to reducing network congestion is to increase available bandwidth by expanding the network infrastructure (e.g., add more optical fiber and coaxial cable lines and additional network resources). However, this can be costly, inefficient, and may be redundant during off-peak times. An attempted solution to help improve content delivery speed without requiring additional network hardware includes a use of transparent caching. While transparent caching enables faster delivery of specific preplaced content to customers, it does not sufficiently address the needs of the industry owing to its limitations, such as being limited to use with the Domain Name System (DNS) protocol, not enabling traffic differentiation between clients, and serving clients with specific preplaced content (e.g., as opposed to serving specific clients with dynamically placed content or services).

SUMMARY

Aspects of the present disclosure provide a technical improvement to the performance of content delivery or the Quality of Service (QoS) of network traffic by using a resource assignment protocol to direct a client request for content or remote processing to a dynamic edge-instance proximate to the client. For example, an instance of a data or compute service can be dynamically deployed as a VNF (Virtualized Network Function) at a strategic location in a network. A client request for content or remote processing can be directed by a resource assignment server to this proximate resource rather than being transmitted from the service provider's network over the internet core to the distant remote content or processing source. Accordingly, data transfer to the core is reduced and delivery speeds are increased, improving QoS and reducing bandwidth requirements.

A system, method, and computer readable storage device are provided that differentiate treatment of a client request for a remote third-party content or processing resource by directing a client eligible for differential traffic treatment to an edge-based instance of the resource, wherein the edge-based instance of the resource is configured to perform a functionality of the remote resource. According to an aspect, the edge-based resource instance can be dynamically-placed, and upon being configured to perform the functionality, traffic can be redirected to the edge-based instance. In various cases, it may be desirable and advantageous to apply different treatment to certain traffic flows. For example, a service provider, such as an internet access provider or an online service or content provider, may wish to provide higher Quality of Service (QoS) for delivery of business-critical data or for data traffic associated with specific clients. In some examples, this provision of higher QoS is based on a determination of whether a client is authorized to consume usage of an edge-based resource based on a policy for differential treatment (e.g., based on a service level agreement (SLA) between the service provider and the specific clients).

Aspects of the present disclosure address this need by providing a policy server in communication with a resource assignment protocol server (e.g., DNS server, DHCP (Dynamic Host Configuration Protocol) server), wherein the policy server is operative or configured to receive an indication of a request for a remote content or processing resource and to determine whether the request satisfies criteria for differentiated traffic treatment. If the criteria are satisfied for differentiated traffic treatment, the policy server is further operative or configured to determine whether an edge-compute resource is available for assignment to the requesting client or whether to deploy a new instance of an edge-compute resource for allocation to the requesting client.

According to aspects, an edge-compute resource can be strategically located, and traffic can be redirected to the edge-compute resource to reduce network bandwidth and to minimize latency. For example, hosting a processing VNF within a certain proximity to a particular client(s) prevents related traffic from having to traverse the service provider's network. Communication with the policy server as part of dynamically placing a compute service on an edge resource to improve data transfer of communications with the service while the resource assignment server is processing a resource assignment request for a location of the service is an efficient use of the processing the resource assignment server resources and can reduce the number of communications that would otherwise be involved in utilizing another resource to authorize a client's usage of the edge resource and to redirect the client to the edge resource. As can be appreciated, providing and directing traffic to an edge-compute resource reduces the travel time for data and reduces the amount of data traffic that otherwise may travel over the internet. This can benefit clients because of improved faster data transfer rates which can improve QoS and QoE (Quality of Experience) for client users. Additionally, instead of adding more servers to the network to increase performance (which is costly and power-intensive), remote content and processing service providers can benefit from a service provider-hosted processing VNF to deliver content/services with increased quality and also without capital expense growth.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the present disclosure.

BRIEF DESCRIPTION OF THE DRAWINGS

Further features, aspects, and advantages of the present disclosure will become better understood by reference to the following figures, wherein like reference numbers indicate like elements throughout the several views.

DETAILED DESCRIPTION

Figure 1:
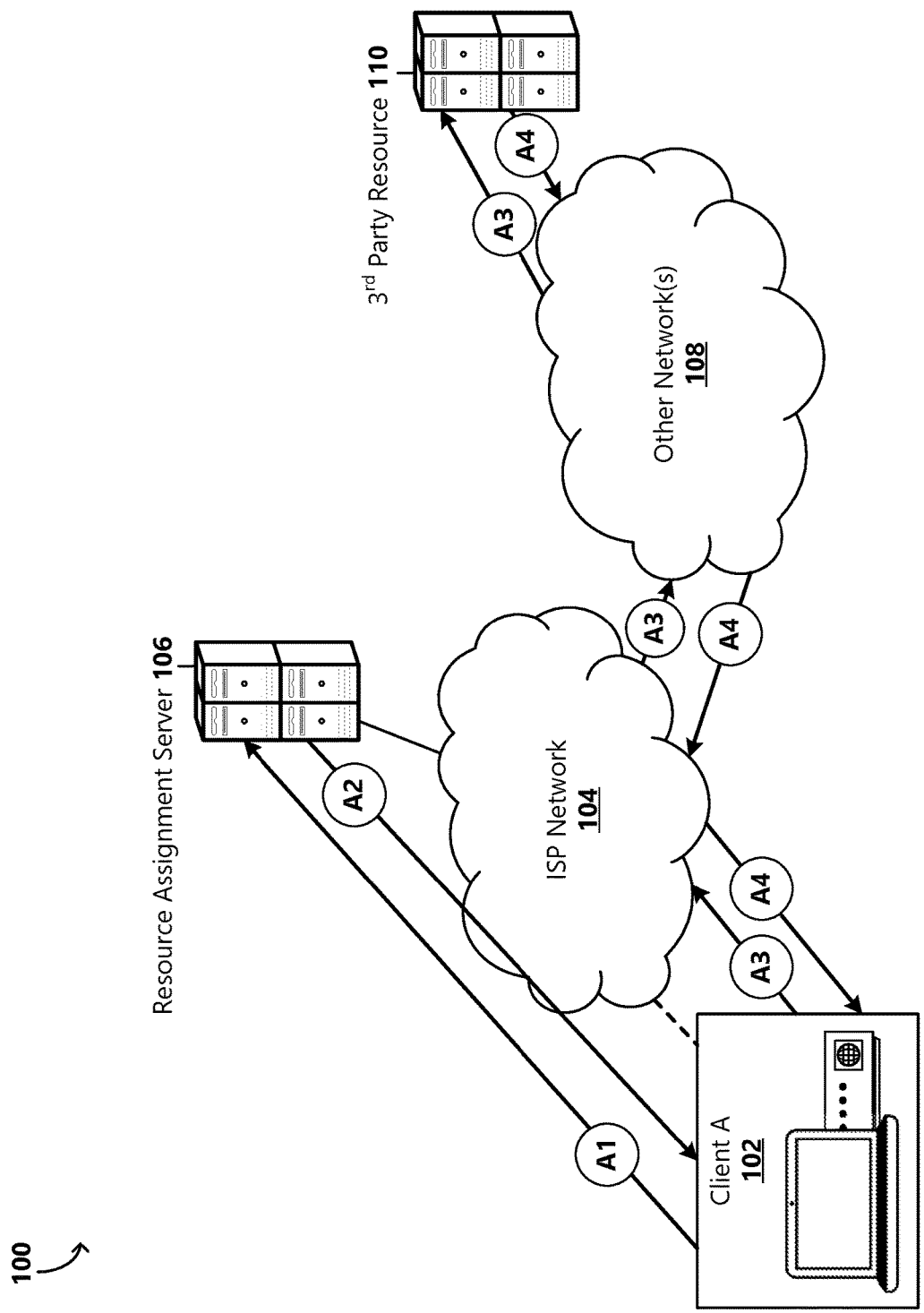
FIG. 1 is a block diagram of an example environment in which network traffic is directed over a combination of networks to a requested third-party resource.

Aspects of the present disclosure provide a technical improvement to network efficiency, thereby improving the QoS of network traffic. By providing policy-based, and resource assignment protocol-implemented edge-compute resource allocation and traffic direction, remote processing and/or content provision functionalities can be dynamically placed in proximity to a client. Accordingly, online services can be performed and delivered with minimal latency and with optimal quality. FIG. 1 is a block diagram of an example operating environment 100 in which network traffic is directed from a client computing device (client A 102) over a combination of networks 104,108 (e.g., the Internet, an intranet, an extranet, local-area networks, wide-area networks, fiber-coax networks, public switched telephone networks, global telephone networks, wired networks, wireless networks, and combinations thereof) to a remote content or processing server (e.g., third-party resource 110, sometimes referred to herein as a remote processing resource). In the illustrated example, client A 102 connects to other networks 108 (e.g., the internet) via an ISP (Internet Service Provider) network 104. According to examples, client A 102 can be implemented as one of various types of computing devices, such as a desktop computer, a tablet device, a mobile phone, a gaming console, a smart object, a dedicated digital media player, a speaker device, a wearable device, a home security and monitoring device, an Internet of Things (IoT) device, a Cyber-Physical Systems (CPS) device, etc. In various examples, client A 102 can include customer premises equipment (CPE), such as a router, network switch, residential gateway (RG), set-top box, fixed mobile convergence product, home networking adapter, or Internet access gateway that enables customers to access service providers' services and distribute them around their house via a local area network (LAN). Details of computing devices and variations thereof can be found in FIGS. 5, 6A, and 6B.

According to an aspect, the third-party resource 110 is operative or configured to provide one or various functionalities or services to clients (e.g., client A 102) over a network. The third-party resource 110 can be implemented as a single computing device or as a plurality of computing devices cooperating in a distributed environment. The third-party resource 110 can be embodied as a variety of server types configured to provide content, data processing (e.g., video processing, coding), or other online service functionalities, such as a web server configured to host a web page, an application server configured to host a web application, a database server configured to maintain and share a database over a network, a file server configured to store and/or share files and folders over a network, a gaming server configured to enable a plurality of computers or gaming devices to play multiplayer games, a media server configured to share digital video or digital audio over a network through media streaming, etc. In various examples, the third-party resource 110 is configured to provide real-time or near real-time online services that may be reliant on fast data transfer speeds to provide quality service. As an example, client A 102 can be embodied as a video doorbell device that communicates with (e.g., send video and audio data to) a third-party resource 110 that is configured to provide video doorbell services to various clients. As another example, client A 102 can be embodied as a video streaming device that communicates with a resource 110 embodied as a media server that provides video streaming to clients. As another example, client A 102 can be embodied as a gaming device that communicates with a third-party resource 110 embodied as a gaming server.

When attempting to access a server (e.g., third-party resource 110), a client (client A 102) is operative or configured to communicate with a resource assignment server 106 for obtaining a location (e.g., an IP (Internet Protocol) address) of the resource. According to an aspect, the resource assignment server 106 can be implemented as one of various types of devices configured to provide and manage resource assignments using one or more types of protocols. As an example, in some implementations, the resource assignment server 106 can be implemented as a Domain Name System (DNS) server operative to resolve a DNS name into an IP address. For example, in an attempt to reach a domain (third-party resource 110), a client (client A 102) can query a DNS server, which, via a directory lookup service, maps a domain name of the third-party resource to an IP address for the requested resource server and responds to the client with the IP address. The client is then able to use the IP address it receives from the DNS server to access the third-party resource 110. As another example, the resource assignment server 106 can be implemented as a Dynamic Host Configuration Protocol (DHCP) server operative to allocate or assign an IP address to a host in a network. For example, when a client device (client A 102) attempts to connect to a network, the client can send a DHCP discover request to the DHCP server, which looks up available IP addresses from an IP address pool and selects an IP address to assign (lease) to the client, enabling the client to communicate with other hosts in a Local Area Network (LAN) or on other networks.

In FIG. 1, various arrows are labeled with circled alpha-numerals indicative of an example flow of data and/or operations among network elements. In the illustrated example, at A1, in an attempt to communicate with the third-party resource 110, client A 102 sends a request to the resource assignment server 106 for a location of the third-party resource 110. For example, if client A 102 is implemented as a video doorbell system, responsive to activation of an associated doorbell (e.g., actuated button, motion detection, user command), a DNS request may be sent to the resource assignment server 106 for a location of the video doorbell server (e.g., remote processing resource/third-party resource 110). At A2, the resource assignment server 106 maps a domain name for the third-party resource 110 to its logical address, and responds to client A 102 with the IP address of the requested resource server. At A3, the received IP address is used by client A 102 to access the third-party resource 110. For example, a notification, video/audio video EDP (electronic data processing) data, and other data may be transmitted from client A 102 to the third-party resource 110 over one or a combination of networks 104,108. The third-party resource 110 may process the data, and at A4, may provide data back to client A 102 or to another client device. As can be appreciated, during off-peak times, there may be little or no network congestion and the services provided by the third-party resource 110 may be provided with QoS performance metrics (e.g., throughput, delay, delay variation, packet loss) that provide for a satisfactory QoE (Quality of Experience) for users. However, during busier times, network congestion may be likely. Accordingly, when data traverses networks, network congestion can cause the services provided by the third-party resource 110 to be negatively affected (e.g., poor video quality, delayed/frozen video, choppy audio). This may result in an unsatisfactory QoE for users.

Figure 2:
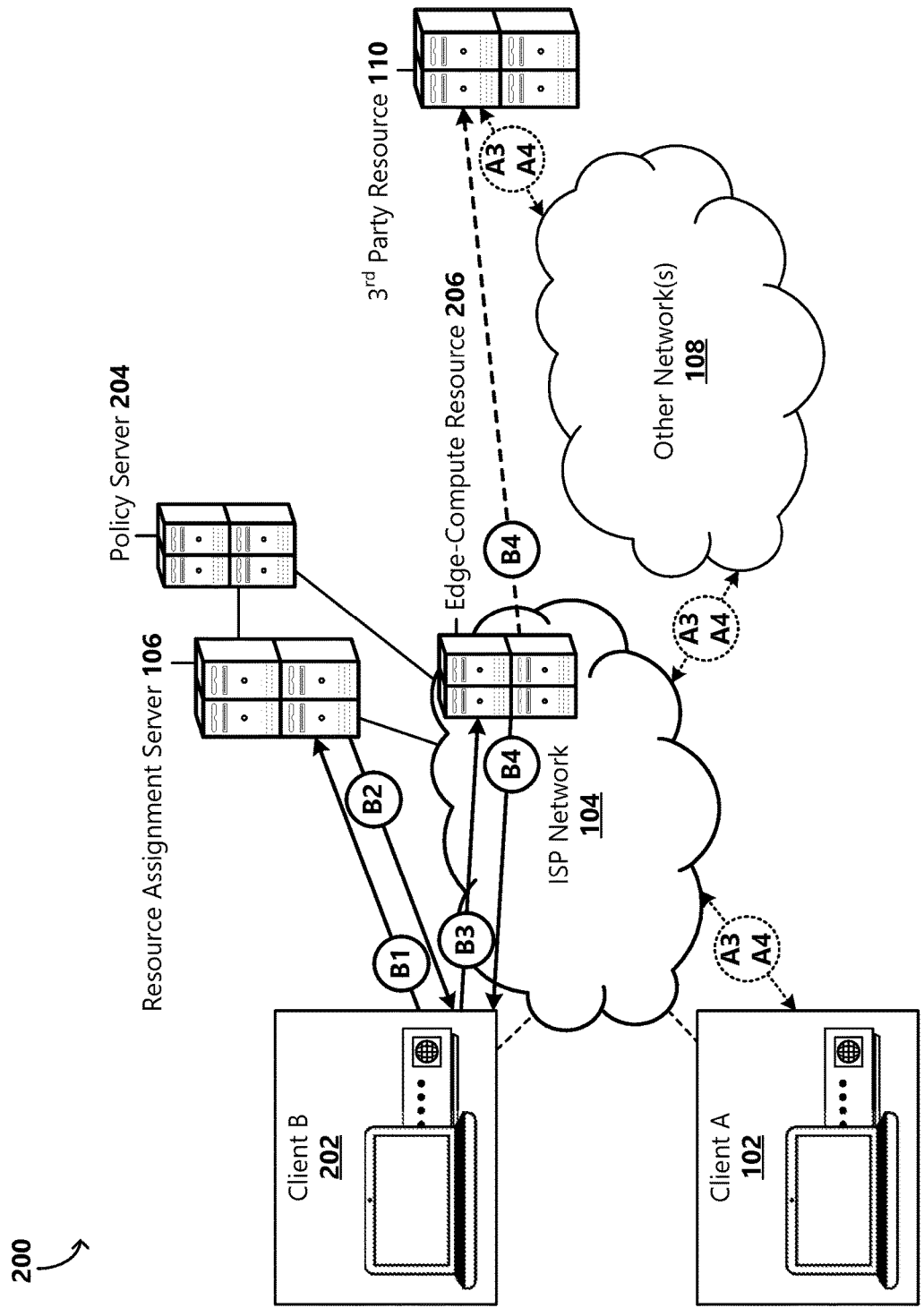
FIG. 2 is a block diagram of an example environment in which a system can be implemented for providing dynamic, policy-based, and resource assignment protocol-implemented edge-compute resource allocation and traffic direction according to an embodiment.

According to aspects of the present disclosure, a policy-integrated resource allocation system can be implemented in the example operating environment 100 for enabling a provision of online services to a client at a level that satisfies particular QoS performance metrics (e.g., throughput, delay, delay variation, packet loss) associated with a satisfactory QoE (Quality of Experience). With reference now to FIG. 2, a block diagram is provided that illustrates an example environment 200 in which a system can be implemented for providing dynamic, policy-based, and resource assignment protocol-implemented edge-compute resource allocation and traffic direction for enabling increased network efficiency. For example and as illustrated in FIG. 2, various arrows are labeled with circled alpha-numerals indicative of an example flow of data and/or operations among network elements. In the illustrated example, at B1, in an attempt to communicate with a remote processing resource (e.g., the third-party resource 110), client B 202 sends a request to the resource assignment server 106 for a location of the third-party resource 110. For purposes of illustration, consider that client B 202 is also implemented as a video doorbell system. Responsive to activation of an associated doorbell (e.g., actuated button, motion detection, user command), a DNS request may be sent to the resource assignment server 106 for obtaining an address for communicating with the video doorbell server (remote processing resource).

According to an aspect, when a client request is received at the resource assignment server 106 for a resource assignment over a protocol (e.g., DNS, DHCP), the resource assignment server communicates with the policy server 204 to determine a response to the client based on policy. In various implementations, the resource assignment server 106 communicates with the policy server 204 via an agent. According to an aspect, a policy can be in place that protects an edge-compute resource 206 from unauthorized access, wherein authorized access may be associated with a subscription for a particular service offered by an ISP. In some examples, the particular service may provide subscribers of the service automatic redirection of traffic to an available edge-compute resource 206, thus differentiating treatment of a subscriber's traffic streams between a subscriber client (e.g., client B 202) and a remote processing resource (e.g., third-party resource 110).

As used herein, the term "edge-compute resource" describes a network resource proximate to a client that is configured to provide functionalities associated with a remote processing resource (e.g., third-party resource 110). As will be described in further detail below, an edge-compute resource 206 can be implemented as one or more VNFs configured to perform particular third-party resource 110 functionalities and deployed on one or more virtual machines on top of standard high-volume servers, switches, storage devices, or other edge-based cloud computing infrastructure. According to an aspect, a third-party service provider associated with the third-party resource 110 may want to place various functionalities associated with their services closer to a client or a group of clients (e.g., client A 102, client B 202). The third-party service provider may place specific network services, applications, and/or functions onto high volume servers, switches, or storage resources at a network edge to optimize (minimize) data transfer. For example, a remote service provider may want to move data and compute functions (e.g., first pass processing) closer to a client to support consumer demand, to increase responsiveness, or generally to avoid potential network congestion issues (e.g., lag, jitter, or dropped packets) that can be associated with traversing the internet to receive data from and provide services to clients. For example, by placing a processing resource at the edge of a network (e.g., at the edge of the ISP network 104 or another proximate network), traffic associated with communicating with remote resources (e.g., third-party resource 110) is reduced, thereby making the network more efficient.

According to an aspect, the policy server 204 is operative or configured to provide information indicating whether the requesting client (e.g., client B 202) is authorized to consume usage of an edge-compute resource 206. For example, the policy server 204 is operative or configured to receive an access control request from the resource assignment server 106, evaluate the request against a policy that defines how network resources are to be allocated among its clients, and return an access control response to the resource assignment server based on the policy evaluation. As illustrated in FIG. 2, the requesting client (e.g., client B 202) is authorized to consume particular traffic differentiation services, where traffic can be automatically directed along a shorter and, in most examples, less-latent route to an edge-compute resource 206. According to an aspect, based on a determination that client B 202 fits a policy for traffic differentiation services, an edge-compute resource 206 is allocated to client B. At B2, the resource assignment server is configured to provide a response to client B 202 directing the client to the edge-compute resource 206 (e.g., the resource assignment server provides location information of the edge-compute resource instead of the address of the third-party resource 110). At B3, client B 202 sends packets of data using the received location information as the destination address. For example, notification data, video/audio video EDP (electronic data processing) data, and other data may be transmitted from client B 202 to the edge-compute resource 206 rather than to the third-party resource 110 over a combination of networks 104,108. The edge-compute resource 206 may process at least a portion of the data and at B4, may provide data back to client A 102, to another client device, or, in various implementations, may forward data to the third-party resource 110 for additional processing, storage, or other service functionalities. By redirecting the client (client A 102) to the edge-compute resource 206, the traditional network traffic associated with communicating with the third-party resource 110 and computational demand on the third-party resource are reduced, thereby making the network more efficient.

Figure 3:
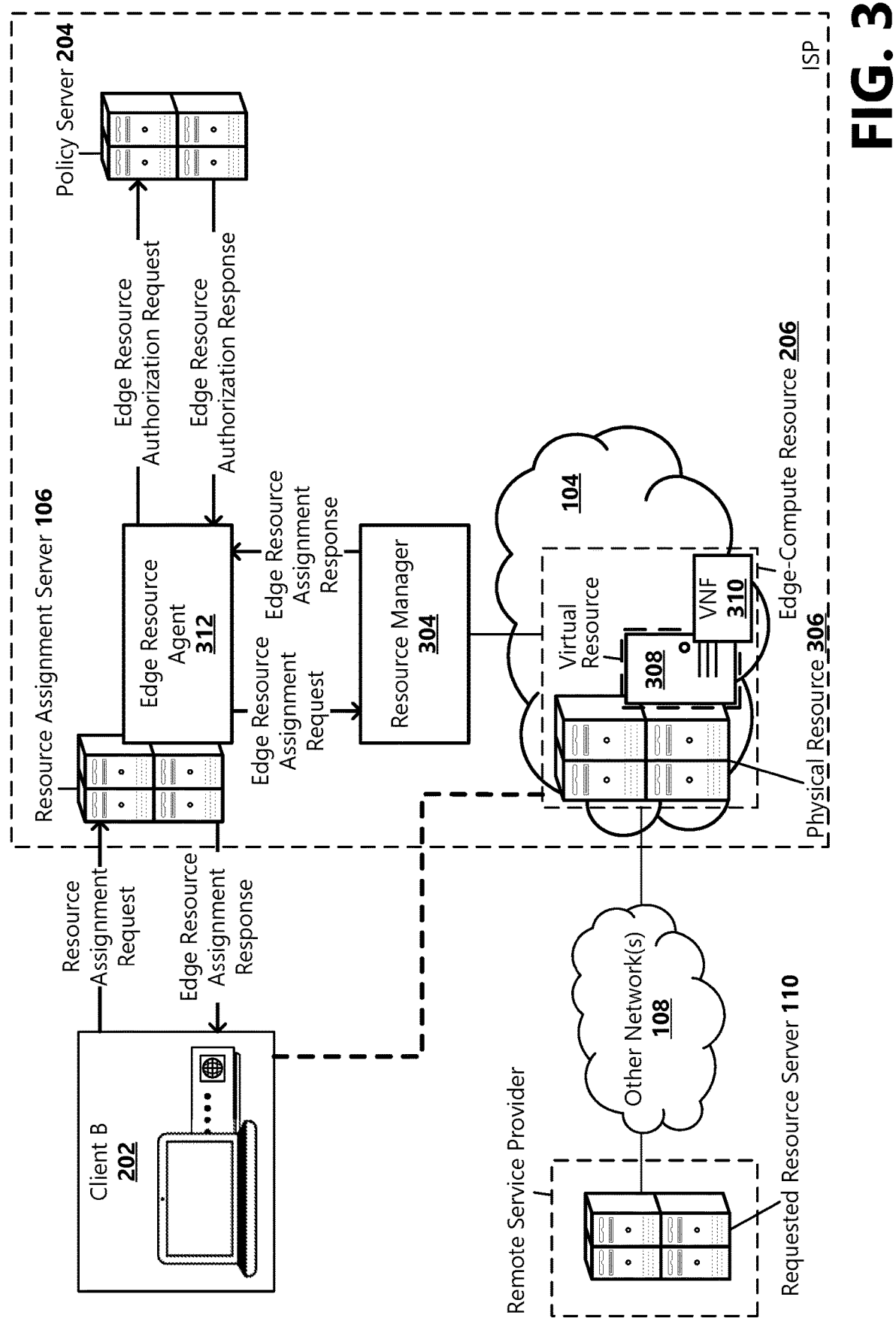
FIG. 3 is a block diagram showing components of a system operative or configured to provide dynamic, policy-based, and resource assignment protocol-implemented edge-compute resource allocation and traffic direction according to an embodiment.

With reference now to FIG. 3, various components of an example system operative or configured to provide dynamic, policy-based, and resource assignment protocol-implemented edge-compute resource 206 allocation and traffic direction are illustrated according to an embodiment. According to an aspect of the present disclosure, the resource assignment server 106 comprises or is communicatively attached to an edge resource agent 312 illustrative of a software application, module, or computing device, which according to one aspect, is operative or configured to communicate with a resource manager 304. The resource manager 304 is operative or configured to manage edge-compute resources 206 in the ISP's infrastructure, which includes management of VNFs 310*a-n* (generally 310), which can include, but is not limited to, setup, maintenance (e.g., updating and/or upgrading a VNF, supporting VNF software changes), and tearing down of VNFs.

As described above, a remote online-service provider may provide one or more VNFs 310 set with particular functionalities of a third-party resource 110 for deployment on one or more virtual resources 308 (e.g., virtual machines) on top of one or more physical resources 306 (e.g., standard high-volume servers, switches, storage devices, or other cloud computing infrastructure) in the ISP's network 104 or another network. According to an aspect, an edge-compute resource 206 may be placed at a strategic location in a network for minimal data transfer. A physical resource 306 provides compute, memory, and networking resources that are abstracted into virtual resources 308 that are ultimately utilized by a VNF 310.

According to an aspect, the resource manager 304 is further operative or configured to provide an edge resource assignment response to the edge resource agent 312 comprising information indicating whether a VNF 310 for the requested resource is available. For example, this can be in response to receiving an edge resource assignment request from the edge resource agent 312 in association with a client-initiated resource assignment request. In some examples, availability refers to whether a VNF 310 instance for the requested resource exists (e.g., whether a VNF has been on-boarded). In some examples, an edge resource assignment response may further include information indicating whether an available VNF 310 is protected (e.g., whether the requesting client needs to be authorized to utilize the VNF).

In some implementations, based on an edge resource assignment response indicating that a VNF 310 instance is available, the edge resource agent 312 is further operative or configured to communicate with the policy server 204 for making a policy-based traffic differentiation decision. An example policy-based traffic differentiation decision includes making a policy-based determination about whether to direct a client to a requested third-party resource 110 or to a proximate edge-instance set with functionalities of the requested third-party resource). For example, the edge resource agent 312 is operative to send an edge resource authorization request to the policy server 204 for evaluating whether the requesting client (e.g., client B 202) fits a policy for the protected resource (e.g., available VNF 310). The policy server 204 is operative or configured to verify or deny the client's authorization and provide the verification or denial in an edge resource authorization response to the edge resource agent 312. A particular client (e.g., client B 202) may be entitled to access an edge-compute resource based on various factors, such as a policy, a service level agreement (SLA) (e.g., between the ISP and a client user), a business rule, etc. In some examples, the policy server 204 is operative or configured to communicate with a data services database that includes information regarding services and products subscribed to by the customer, for obtaining necessary data for determining whether the client satisfies criteria for authorized usage of an edge-compute resource 206.

When authorization is verified by the policy server 204, the edge resource agent 312 allows the resource manager 304 to allocate the available VNF 310 to the requesting client (e.g., client B 202). In some examples, an available VNF 310 may be on-boarded, but has not been instantiated, may be instantiated but not configured, may be instantiated and configured but inactive, or may be instantiated and configured and active. Depending on the VNF's state, the resource manager 304 is operative to transition the VNF 310 into a state such that it is configured for service. In some examples, this can include starting a VNF instance, scaling out (e.g., adding an additional VNF instance), and/or scaling up (e.g., increasing compute, network, and/or storage resources for a VNF instance) to allocate the VNF 310 to the requesting client (e.g., client B 202).

According to an aspect, when authorization is verified by the policy server 204 and a VNF 310 has been allocated to the requesting client (e.g., client B 202), the edge resource agent 312 is operative or configured to direct the requesting client to the allocated VNF 310. For example, the edge resource agent 312 provides an address for the VNF 310 for the resource assignment server 106 to provide in a response to client B 202 responsive to resource assignment request received from client B. That is, responsive to receiving the resource assignment request received from client B 202, the resource assignment server 106 provides an edge resource assignment response that redirects the client to the VNF 310 for enabling use of optimally-placed service functionalities.

Figure 4:
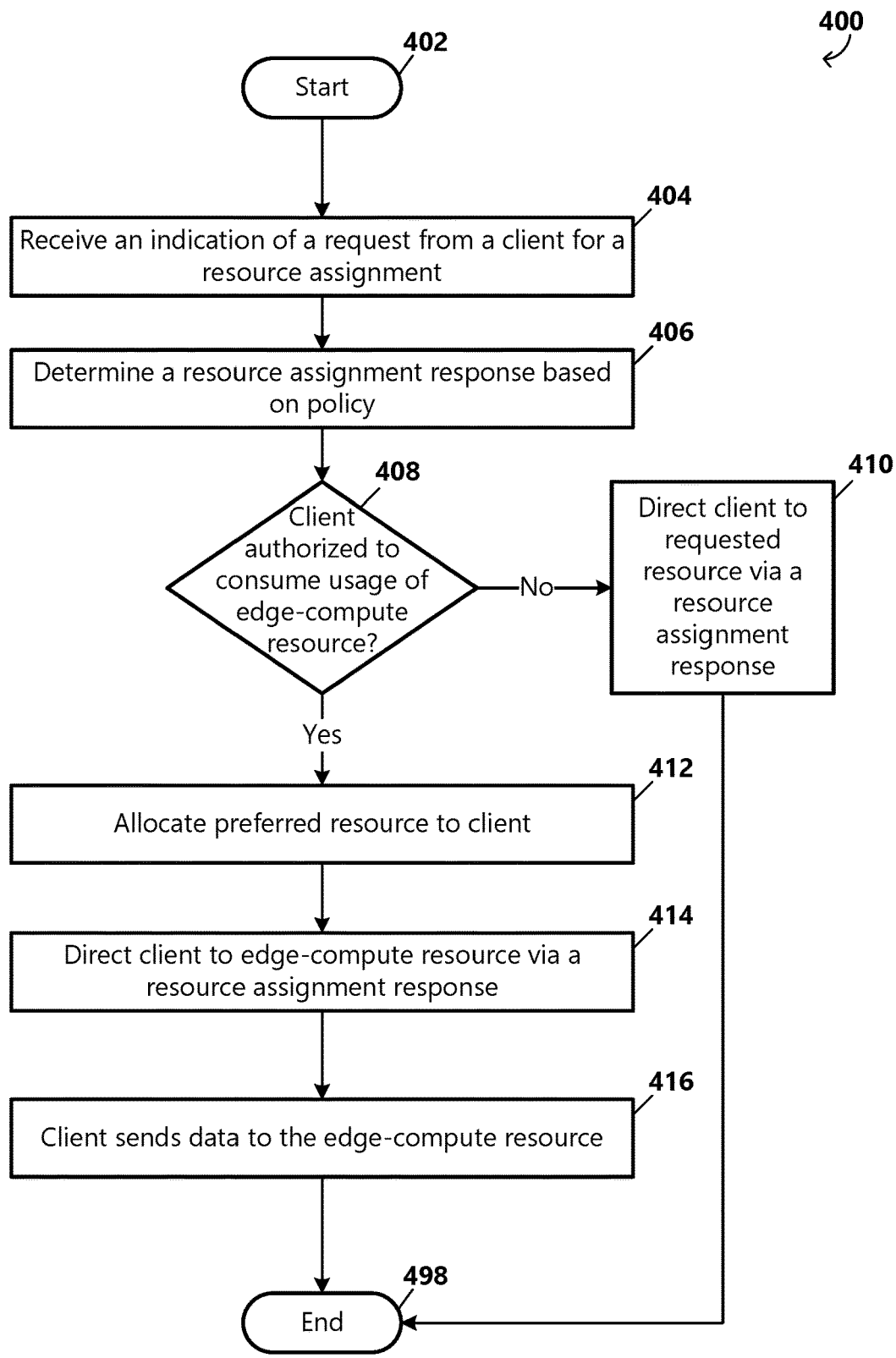
FIG. 4 is a flow diagram of depicting general stages of an example process for providing dynamic, policy-based, and resource assignment protocol-implemented edge-compute resource allocation and traffic direction according to an embodiment.

FIG. 4 is a flow diagram that depicts general stages of an example method 400 for providing dynamic, policy-based, and resource assignment protocol-implemented edge-compute resource allocation and traffic direction according to an embodiment. The method 400 begins at START OPERATION 402, and proceeds to OPERATION 404 where the method uses the resource assignment server 106 to receive a request from a client for a resource assignment over a protocol (e.g., DNS, DHCP). For example, the requesting client may request a location of a third-party resource 110 for sending data to and/or requesting information from the resource configured to provide functionalities in association with an online service.

At OPERATION 406, the resource assignment server 106 communicates with the policy server 204 to determine a response to the requesting client based on policy. In various implementations, the resource assignment server 106 communicates with the policy server 204 via the edge resource agent 312. In various implementations, at OPERATION 406, the resource assignment server 106 further uses the edge resource agent 312 to communicate with the resource manager 304 for determining whether an edge-compute resource 206 is available (e.g., has been on-boarded) for the requested resource (third-party resource 110).

At DECISION OPERATION 408, the method 400 uses the policy server 204 to determine whether the requesting client is authorized to use an available edge-compute resource 206. For example, a policy may be in place that protects an edge-compute resource 206 from unauthorized access. At OPERATION 408, the edge resource agent 312 sends an edge resource authorization request to the policy server 204, and the policy server evaluates the policy for determining whether the requesting client satisfies the policy (e.g., whether the requesting client is associated with a subscription for a particular service offered by an ISP that provides subscribers of the service with automatic redirection of traffic to an available edge-compute resource 206. Additionally at OPERATION 408, the policy server 204 responds to the edge resource authorization request with a response indicating whether the client's access to the edge-compute resource 206 is accepted or denied.

If the requesting client is not authorized to consume usage of the edge-compute resource 206, the method 400 proceeds to OPERATION 410, where the method uses the resource assignment server 106 to respond to the resource assignment request with a normal resource assignment response (e.g., an IP address associated with a domain name of the requested resource), which it sends to the requesting client. For example, the client is directed through the ISP network 104 and through other networks 108 to the requested third-party resource 110.

If, at DECISION OPERATION 408, a determination is made that the requesting client is authorized to consume usage of the edge-compute resource, the method 400 proceeds to OPERATION 412, where the method uses the resource manager 304 to allocate the edge-compute resource 206 to the requesting client. In some examples, allocation of the edge-compute resource 206 includes instantiating the VNF 310 if it has not yet been instantiated and/or configuring the VNF if it has not been configured such that the VNF is in a state for performing its functionality. In some examples, allocation of the edge-compute resource 206 can further include scaling out and/or scaling up a VNF instance for meeting the requirements (e.g., connectivity requirements, bandwidth, latency) for functionality of the VNF, load balancing, etc.

At OPERATION 414, the method 400 uses the resource assignment server 106 to respond to the resource assignment request with an edge resource assignment response (e.g., an IP address of the VNF 310 instead of the IP address of the requested resource), which it sends to the requesting client.

At OPERATION 416, the method 400 uses the client to send data to the edge-compute resource 206/the VNF 310 instance allocated to the client, whereby the traditional network traffic associated with communicating with the remote third-party resource and computational demand on the third-party resource are reduced. The method 400 ends at OPERATION 498.

Figure 5:
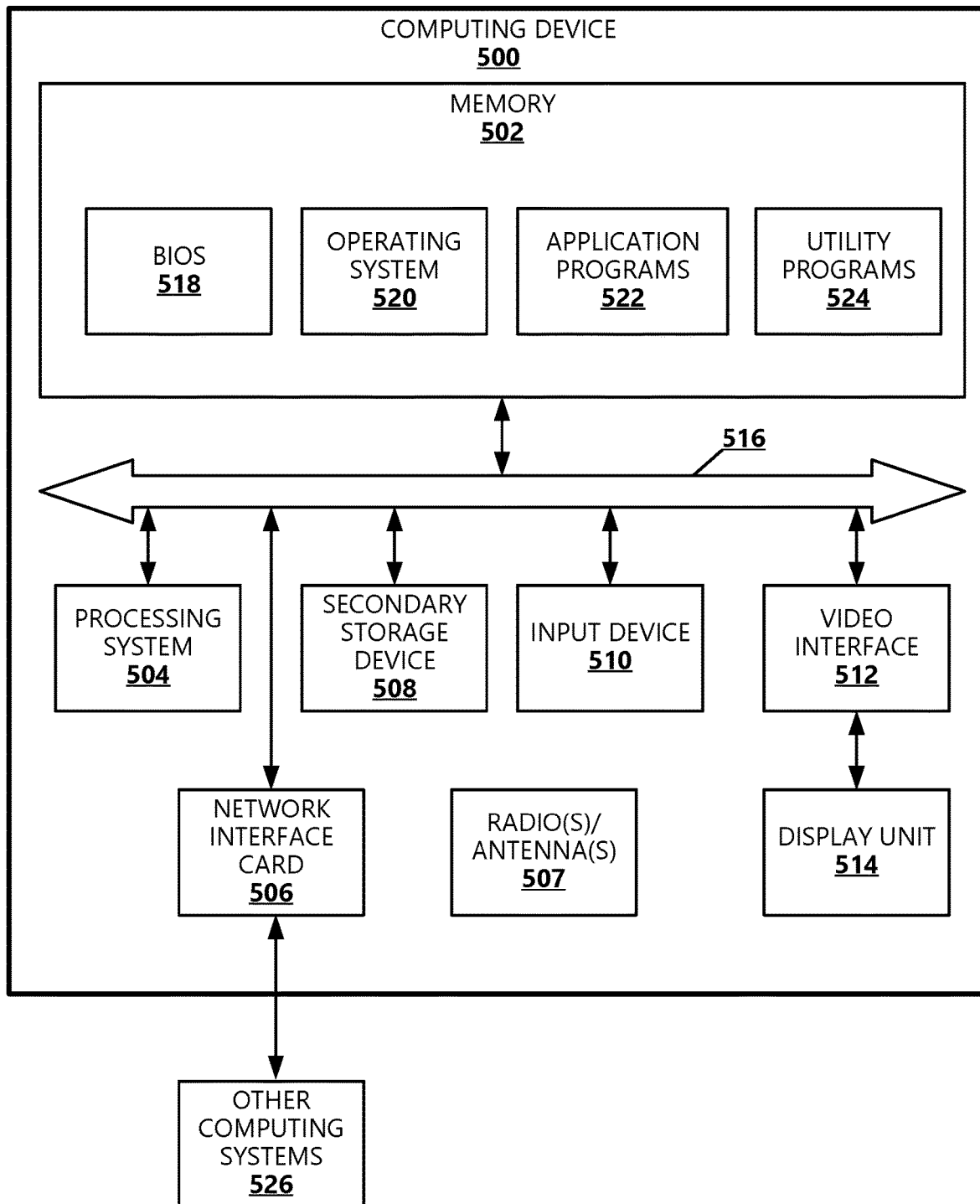
FIG. 5 is a block diagram illustrating example physical components of a computing device or system with which embodiments may be practiced.

FIG. 5 is a block diagram illustrating example physical components of a computing device or system 500 with which embodiments may be practiced. It should be appreciated that in other embodiments, different hardware components other than those illustrated in the example of FIG. 5 may be used. Computing devices may be implemented in different ways in different embodiments. For instance, in the example of FIG. 5, the computing device 500 includes a processing system 504, memory 502, a network interface 506 (wired and/or wireless), radio/antenna 507, a secondary storage device 508, an input device 510, a video interface 512, a display unit 514, and a communication medium 516. In other embodiments, the computing device 500 may be implemented using more or fewer hardware components (e.g., a video interface, a display unit, or an input device) or in combination with other types of computer systems and program modules 526.

The memory 502 includes one or more computer-readable storage media capable of storing data and/or computer-executable instructions. Memory 502 may store the computer-executable instructions that, when executed by processor 504, provide dynamic, policy-based, and resource assignment protocol-implemented edge-compute resource allocation and traffic direction according to an embodiment. In various embodiments, the memory 502 is implemented in various ways. For example, the memory 502 can be implemented as various types of computer-readable storage media. Example types of computer-readable storage media include, but are not limited to, solid state memory, flash memory, dynamic random access memory (DRAM), double data rate synchronous dynamic random access memory (DDR SDRAM), DDR2 SDRAM, DDR3 SDRAM, read-only memory (ROM), reduced latency DRAM, electrically-erasable programmable ROM (EEPROM), and other types of devices and/or articles of manufacture that store data.

The term computer-readable storage medium may also refer to devices or articles of manufacture that store data and/or computer-executable instructions readable by a computing device. The term computer-readable storage media encompasses volatile and nonvolatile, removable and non-removable media implemented in various methods or technologies for storage and retrieval of information. Such information can include data structures, program modules, computer-executable instructions, or other data.

The processing system 504 includes one or more processing units, which may include tangible integrated circuits that selectively execute computer-executable instructions. In various embodiments, the processing units in the processing system 504 are implemented in various ways. For example, the processing units in the processing system 504 can be implemented as one or more processing cores. In this example, the processing system 504 can comprise one or more microprocessors. In another example, the processing system 504 can comprise one or more separate microprocessors. In yet another example embodiment, the processing system 504 can comprise Application-Specific Integrated Circuits (ASICs) that provide specific functionality. In yet another example, the processing system 504 provides specific functionality by using an ASIC and by executing computer-executable instructions.

The computing device 500 may be enabled to send data to and receive data from a communication network via a network interface card 506. In different embodiments, the network interface card 506 is implemented in different ways, such as an Ethernet interface, a token-ring network interface, a fiber optic network interface, a wireless network interface (e.g., WIFI, Wi-Max, etc.), or another type of network interface. The network interface may allow the device to communicate with other devices, such as over a wireless network in a distributed computing environment, a satellite link, a cellular link, and comparable mechanisms. Other devices may include computer device(s) that execute communication applications, storage servers, and comparable devices.

The secondary storage device 508 includes one or more computer-readable storage media, and may store data and computer-executable instructions not directly accessible by the processing system 504. That is, the processing system 504 performs an I/O operation to retrieve data and/or computer-executable instructions from the secondary storage device 508. In various embodiments, the secondary storage device 508 can be implemented as various types of computer-readable storage media, such as by one or more magnetic disks, magnetic tape drives, CD-ROM discs, DVD-ROM discs, BLU-RAY discs, solid state memory devices, and/or other types of computer-readable storage media.

The input device 510 enables the computing device 500 to receive input from a user. Example types of input devices include, but are not limited to, keyboards, mice, trackballs, stylus input devices, key pads, microphones, joysticks, touch-sensitive display screens, and other types of devices that provide user input to the computing device 500.

The video interface 512 outputs video information to the display unit 514. In different embodiments, the video interface 512 is implemented in different ways. For example, the video interface 512 is a video expansion card. In another example, the video interface 512 is integrated into a motherboard of the computing device 500. In various embodiments, the display unit 514 can be an LCD display panel, a touch-sensitive display panel, an LED screen, a projector, a cathode-ray tube display, or another type of display unit. In various embodiments, the video interface 512 communicates with the display unit 514 in various ways. For example, the video interface 512 can communicate with the display unit 514 via a Universal Serial Bus (USB) connector, a VGA connector, a digital visual interface (DVI) connector, an S-Video connector, a High-Definition Multimedia Interface (HDMI) interface, a DisplayPort connector, or another type of connection.

The communications medium 516 facilitates communication among the hardware components of the computing device 500. In different embodiments, the communications medium 516 facilitates communication among different components of the computing device 500. For instance, in the example of FIG. 5, the communications medium 516 facilitates communication among the memory 502, the processing system 504, the network interface card 506, the secondary storage device 508, the input device 510, and the video interface 512. In different embodiments, the communications medium 516 is implemented in different ways, such as a PCI bus, a PCI Express bus, an accelerated graphics port (AGP) bus, an InfiniBand® interconnect, a serial Advanced Technology Attachment (ATA) interconnect, a parallel ATA interconnect, a Fiber Channel interconnect, a USB bus, a Small Computing system Interface (SCSI) interface, or another type of communications medium.

The memory 502 stores various types of data and/or software instructions. For instance, in the example of FIG. 5, the memory 502 stores a Basic Input/Output System (BIOS) 518, and an operating system 520. The BIOS 518 includes a set of software instructions that, when executed by the processing system 504, cause the computing device 500 to boot up. The operating system 520 includes a set of software instructions that, when executed by the processing system 504, cause the computing device 500 to provide an operating system that coordinates the activities and sharing of resources of the computing device 500. The memory 502 also stores one or more application programs or program code 522 that, when executed by the processing system 504, cause the computing device 500 to provide applications to users. The memory 502 also stores one or more utility programs 524 that, when executed by the processing system 504, cause the computing device 500 to provide utilities to other software programs.

Embodiments may be used in combination with any number of computer systems, such as in server environments, desktop environments, laptop or notebook computer systems, multiprocessor systems, micro-processor based or programmable consumer electronics, networked PCs, mini computers, main frame computers and the like. Embodiments may be utilized in various distributed computing environments where tasks are performed by remote processing devices that are linked through a communications network in a distributed computing environment, and where program code may be located in local and/or remote memory storage (e.g., memory and/or disk(s)).

All system components described herein may be communicatively coupled via any method of network connection known in the art or developed in the future including, but not limited to wired, wireless, modem, dial-up, satellite, cable modem, Digital Subscriber Line (DSL), Asymmetric Digital Subscribers Line (ASDL), Virtual Private Network (VPN), Integrated Services Digital Network (ISDN), X.25, Ethernet, token ring, Fiber Distributed Data Interface (FDDI), IP over Asynchronous Transfer Mode (ATM), Infrared Data Association (IrDA), wireless, WAN technologies (T1, Frame Relay), Point-to-Point Protocol over Ethernet (PPoE), etc. including any combination thereof.

Figures 6A, 6B:
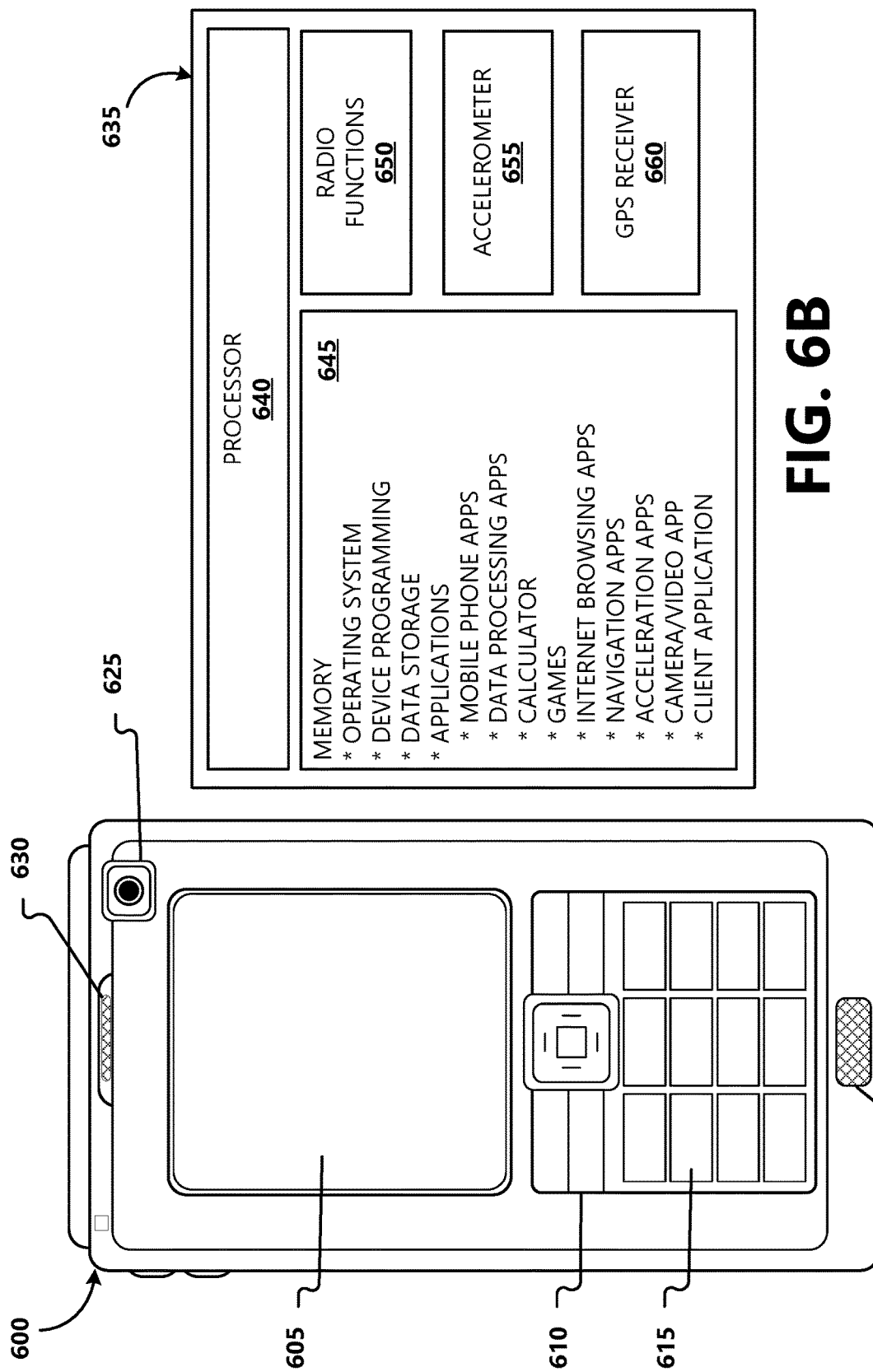
FIGS. 6A and 6B are block diagrams illustrating example physical components of a suitable mobile computing environment with which aspects of the present disclosure can be practiced.

FIGS. 6A-6B illustrate a suitable mobile computing device 600 or environment, for example, a mobile computing device or smart phone, a tablet personal computer, a laptop computer, or other user device 102, with which aspects can be practiced. The mobile computing device 600 is illustrative of any suitable device operative to send, receive and process wireless communications. A display screen 605 is operative for displaying a variety of information such as information about incoming and outgoing communications, as well as, a variety of data and displayable objects, for example, text, alphanumeric data, photographs, and the like.

Data input to the mobile computing device 600 can be performed via a variety of suitable means, such as, touch screen input via the display screen 605, keyboard or keypad input via a data entry area 610, key input via one or more selectable buttons or controls 615, voice input via a microphone 618 disposed on the mobile computing device 600, photographic input via a camera 625 functionality associated with the mobile computing device 600, or any other suitable input means. Data can be output via the mobile computing device 600 via any suitable output means, including but not limited to, display on the display screen 605, audible output via an associated speaker 630 or connected earphone system, vibration module for providing tactile output, and the like.

Referring now to FIG. 6B, operational unit 635 is illustrative of internal operating functionality of the mobile computing device 600. A processor 640 is illustrative of a computer processor for processing incoming and outgoing data and communications and controlling operation of the device and associated software applications via a mobile computing device operating system. Memory 645 can be utilized for storing a device operating system, device programming, one or more stored applications, for example, mobile telephone applications, data processing applications, calculators, games, Internet browsing applications, navigation applications, acceleration applications, camera and/or video applications, etc.

Mobile computing device 600 can contain an accelerometer 655 for detecting acceleration, and can be used to sense orientation, vibration, and/or shock. Mobile computing device 600 can contain a global positioning system (GPS) system (e.g., GPS send/receive functionality) 660. A GPS system 660 uses radio waves to communicate with satellites orbiting the Earth. Some GPS-enabled mobile computing devices use wireless-assisted GPS to determine a user's location, wherein the device uses orbiting GPS satellites in conjunction with information about the device's mobile phone signal. Radio functions 650 include all required functionality, including onboard antennae, for allowing the mobile computing device 600 to communicate with other communication devices and systems via a wireless network. Radio functions 650 can be utilized to communicate with a wireless or WIFI-based positioning system to determine a device location.

Figure 7:
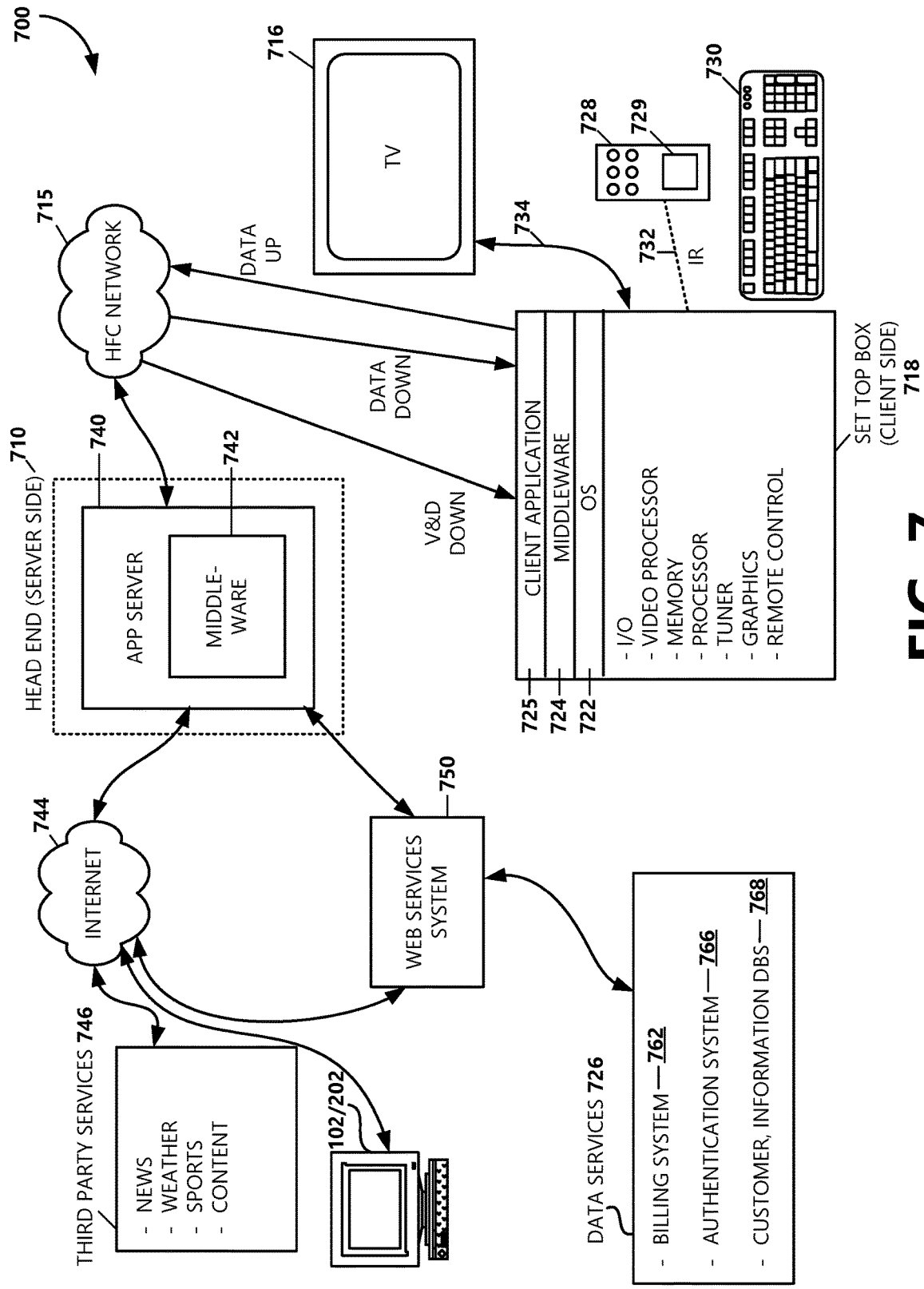
FIG. 7 is a block diagram illustrating components of a cable services system architecture providing an example operating environment according to aspects of the present disclosure.

FIG. 7 is a block diagram illustrating a cable television services system 700 (hereafter referred to as "CATV") architecture providing an operating environment according to an aspect. Referring now to FIG. 7, digital and analog video programming, information content, and interactive television services are provided via a hybrid fiber coax (HFC) network 715 to a television set 716 for consumption by a cable television/services system customer. As is known to those skilled in the art, HFC networks 715 combine both optical fiber and coaxial cable lines. Typically, optical fiber runs from the cable head end 710 to neighborhoods of subscribers. Coaxial cable runs from the optical fiber feeders to each customer or subscriber. The functionality of the HFC network 715 allows for efficient bidirectional data flow between the set-top box 718 and the application server 740 of the aspect.

The CATV system 700 is in the form of a distributed client-server computing system for providing video and data flow across the HFC network 715 between server-side services providers (e.g., cable television/services providers) via a server-side head end 710 and a client-side customer via a set-top box (STB) 718 functionally connected to a customer receiving device, such as the television set 716. As is understood by those skilled in the art, modern CATV systems 700 can provide a variety of services across the HFC network 715 including traditional digital and analog video programming, telephone services, high speed Internet access, video-on-demand, and services.

On the client side of the CATV system 700, digital and analog video programming and digital and analog data are provided to the customer television set 716 via the STB 718. Interactive television services that allow a customer to input data to the CATV system 700 likewise are provided by the STB 718. As illustrated in FIG. 7, the STB 718 is a multipurpose computing device having a computer processor, memory, and an input/output mechanism. The input/output mechanism receives input from server-side processes via the HFC network 715 and from customers via input devices such as a remote control device 728, keyboard 730, or other computing device, such as a tablet/slate computer, smart phone, etc. The remote control device 728 and the keyboard 730 can communicate with the STB 718 via a suitable communication transport such as the infrared connection 732. The remote control device 728 can include a biometric input module 729. The STB 718 also includes a video processor for processing and providing digital and analog video signaling to the television set 716 via a cable communication transport 734. A multi-channel tuner is provided for processing video and data to and from the STB 718 and the server-side head end system 710, described below.

The STB 718 also includes an operating system 722 for directing the functions of the STB 718 in conjunction with a variety of client applications 725. For example, if a client application 725 requires a news flash from a third-party news source to be displayed on the television 716, the operating system 722 can cause the graphics functionality and video processor of the STB 718, for example, to output the news flash to the television 716 at the direction of the client application 725 responsible for displaying news items.

Because a variety of different operating systems 722 can be utilized by a variety of different brands and types of set-top boxes 718, a middleware layer 724 can be provided to allow a given software application to be executed by a variety of different operating systems. According to an embodiment, the middleware layer 724 can include a set of application programming interfaces (APIs) that are exposed to client applications and operating systems 722 that allow client applications 725 to communicate with the operating systems 722 through common data calls understood via the API set. As described below, a corresponding middleware layer 742 is included on the server side of the CATV system 700 for facilitating communication between the server-side application server and the client-side STB 718. The middleware layer 742 of the server-side application server and the middleware layer 724 of the client-side STB 718 can format data passed between the client side and server side according to the Extensible Markup Language (XML).

According to one aspect, the STB 718 passes digital and analog video and data signaling to the television 716 via a one-way communication transport 734. According to other aspects, two-way communication transports can be utilized, for example, via high definition multimedia (HDMI) ports. The STB 718 can receive video and data from the server side of the CATV system 700 via the HFC network 715 through a video/data downlink and data via a data downlink. The STB 718 can transmit data from the client side of the CATV system 700 to the server side of the CATV system 700 via the HFC network 715 via one data uplink. The video/data downlink is an "in band" downlink that allows for digital and analog video and data signaling from the server side of the CATV system 700 through the HFC network 715 to the STB 718 for use by the STB 718 and for distribution to the television set 716. As is understood by those skilled in the art, the "in band" signaling space operates at a relative high frequency, e.g., between 54 and 1000 megahertz. The signaling space is generally divided into 6 megahertz channels in which can be transmitted as a single analog signal or a greater number (e.g., ten) of digital signals.

The data downlink and the data uplink, illustrated in FIG. 7, between the HFC network 715 and the set-top box 718 comprise "out of band" data links. As is understand by those skilled in the art, the "out of band" frequency range is generally at a lower frequency than "in band" signaling. For example, the "out of band" frequency range can be between zero and 54 megahertz. Data flow between the STB 718 and the server-side application server 740 is typically passed through the "out of band" data links. Alternatively, an "in band" data carousel can be positioned in an "in band" channel into which a data feed can be processed from the application server 740 through the HFC network 715 to the STB 718. Operation of data transport between components of the CATV system 700, described with reference to FIG. 7, is well known to those skilled in the art.

Referring still to FIG. 7, the head end 710 of the CATV system 700 is positioned on the server side of the CATV system and includes hardware and software systems responsible for originating and managing content for distributing through the HFC network 715 to client-side STBs 718 for presentation to customers. As described above, a number of services can be provided by the CATV system 700, including digital and analog video programming, interactive television services, telephone services, video-on-demand services, targeted advertising, and/or provision of supplemental content.

The application server 740 can be configured as a computing system operative to assemble and manage data sent to and received from the STB 718 via the HFC network 715. As described above, the application server 740 includes a middleware layer 742 for processing and preparing data from the head end 710 of the CATV system 700 for receipt and use by the client-side STB 718. For example, the application server 740 via the middleware layer 742 can obtain supplemental content from third-party services 746 via the Internet 744 for transmitting to a customer through the HFC network 715, the STB 718, and recording by a local or remote DVR. For example, content metadata from a third-party content provider service can be downloaded by the application server 740 via the Internet 744. When the application server 740 receives the downloaded content metadata, the middleware layer 742 can be utilized to format the content metadata for receipt and use by the STB 718. Therefore, content metadata can be sent and categorized based on the availability to the customer's program guide data.

According to one embodiment, data obtained and managed by the middleware layer 742 of the application server 740 is formatted according to the Extensible Markup Language and is passed to the STB 718 through the HFC network 715 where the XML-formatted data can be utilized by a client application 725 in concert with the middleware layer 724, as described above. As should be appreciated by those skilled in the art, a variety of third-party services data 746, including news data, weather data, sports data and other information content can be obtained by the application server 740 via distributed computing environments such as the Internet 744 for provision to customers via the HFC network 715 and the STB 718.

According to aspects, the application server 740 obtains customer support services data, including billing data, information on customer work order status, answers to frequently asked questions, services provider contact information, and the like from data services 726 for provision to the customer via an interactive television session. The data services 726 include a number of services operated by the services provider of the CATV system 700 which can include profile and other data associated with a given customer.

A billing system 762 can include information such as a customer's name, street address, business identification number, Social Security number, credit history, and information regarding services and products subscribed to by the customer. According to embodiments, the billing system 762 can also include billing data for services and products subscribed to by the customer for bill processing, billing presentment and payment receipt.

A customer information database 768 can include general information about customers such as place of employment, business address, business telephone number, and demographic information such as age, gender, educational level, and the like. The customer information database 768 can also include information on pending work orders for services or products ordered by the customer. The customer information database 768 can also include general customer information such as answers to frequently asked customer questions and contact information for various service provider offices/departments. As should be understood, this information can be stored in a variety of disparate databases operated by the cable services provider.

Referring still to FIG. 7, web services system 750 is illustrated between the application server 740 and the data services 726. According to aspects, web services system 750 serves as a collection point for data requested from each of the disparate data services systems comprising the data services 726. According to aspects, when the application server 740 requires customer services data from one or more of the data services 726, the application server 740 passes a data query to the web services system 750. The web services system 750 formulates a data query to each of the available data services systems for obtaining any required data for a requesting customer as identified by a set-top box identification associated with the customer.

The web services system 750 serves as an abstraction layer between the various data services systems and the application server 740. That is, the application server 740 is not required to communicate with the disparate data services systems, nor is the application server 740 required to understand the data structures or data types utilized by the disparate data services systems. The web services system 750 is operative to communicate with each of the disparate data services systems for obtaining necessary customer data. The customer data obtained by the web services system is assembled and is returned to the application server 740 for ultimate processing via the middleware layer 742, as described above. An authentication system 766 can include information such as secure user names, subscriber profiles, subscriber IDs, and passwords utilized by customers for access to network services. As should be understood by those skilled in the art, the disparate systems 750, 762, 766, 768 can be integrated or provided in any combination of separate systems, wherein FIG. 7 shows only one example.

Aspects, for example, are described above with reference to block diagrams and/or operational illustrations of methods, systems, and computer program products according to embodiments. The functions/acts noted in the blocks can occur out of the order as shown in any flowchart or described herein. For example, two processes shown or described in succession can in fact be executed substantially concurrently or the blocks can sometimes be executed in the reverse order, depending upon the functionality/acts involved.

While certain embodiments have been described, other embodiments may exist. Furthermore, although embodiments have been described as being associated with data stored in memory and other storage mediums, data may also be stored on or read from other types of computer-readable storage media. Further, the disclosed processes may be modified in any manner, including by reordering and/or inserting or deleting a step or process, without departing from the embodiments.

The foregoing description has been presented for the purposes of illustration and description. It is not intended to be exhaustive or to limit the embodiments to the precise forms disclosed. Many modifications and variations are possible in light of the above teaching. It is intended that the scope of the invention be limited not with this detailed description, but rather by the claims appended hereto.

We claim:

1. A system for providing traffic redirection to an edge-compute resource for improved quality of service of network traffic, the system comprising a resource assignment server, comprising:
   at least one processor;
   a memory storage device including instructions that when executed by the at least one processor are configured to:
      receive, from a client, a resource assignment request for a location of a third-party resource for directing the client to the third-party resource;
      determine, based on a policy, whether the client is authorized to consume usage of an edge-compute resource that is configured to perform a functionality of the third-party resource; and
      when a determination is made that the client is authorized to consume usage of the edge-compute resource:
         communicate a request to a resource manager for allocation of the edge-compute resource to the client; and
         redirect the client to the edge-compute resource to consume usage of the functionality of the third-party resource.

2. The system of claim 1, wherein the edge-compute resource is a virtual network function (VNF) set with the functionality of the third-party resource and is executed using compute capabilities of a virtual resource operating on a physical resource in an optimized location in a network.

3. The system of claim 2, wherein the optimized location in the network is an optimized location based on a minimized overall service-path and minimized latency.

4. The system of claim 2, wherein the edge-compute resource is configured as one of:
   a processing resource;
   a content storage resource; or
   a content provision resource.

5. The system of claim 2, wherein the policy is associated with a subscription for a particular service offered by an internet service provider, wherein the particular service provides subscribers of the service with automatic redirection of traffic to available edge-compute resources.

6. The system of claim 5, wherein in determining whether the client is authorized to consume usage of the edge-compute resource that is configured to perform the functionality of the third-party resource, the resource assignment server is configured to communicate with a policy server, wherein the policy server is configured to:
   determine one or more functionalities associated with one or more edge-compute resources that the client is authorized to consume based on an evaluation of the policy, wherein the one or more edge-compute resources include the edge-compute resource configured to perform the functionality of the third-party resource; and
   provide an enumeration of one or more functionalities that the client is authorized to consume in an edge resource authorization response.

7. The system of claim 6, wherein the resource assignment server comprises or is communicatively attached to an edge resource agent configured to communicate with the policy server for verifying the client's authorization to consume usage of the edge-compute resource.

8. The system of claim 7, wherein the edge resource agent is further configured to communicate with the resource manager for:
   configuring the edge-compute resource to perform the functionality of the third-party resource; and
   allocating the edge-compute resource to the client.

9. The system of claim 8, wherein:
   the edge resource agent is further configured to communicate with the resource manager for determining whether the edge-compute resource associated with the third-party resource is available; and
   availability of the edge-compute resource includes existence of a set of services on-boarded on a network resource proximate to the client and configured to perform the functionality of the third-party resource.

10. The system of claim 1, wherein in redirecting the client to consume usage of the functionality of the edge-compute resource, the resource assignment server is configured to communicate a location of the edge-compute resource utilizing an established protocol selected from a group comprising:
    a Domain Name System (DNS) protocol; and
    a Dynamic Host Configuration Protocol (DHCP).

11. A method for providing traffic redirection to an edge-compute resource for improved quality of service of network traffic, the method comprising:
    receiving, from a client, a resource assignment request for a location of a third-party resource for directing the client to the third-party resource;
    determining, based on a policy, whether the client is authorized to consume usage of an edge-compute resource associated with the third-party resource, wherein the edge-compute resource is configured to perform a functionality of the third-party resource; and
    when a determination is made that the client is authorized to consume usage of the edge-compute resource for performing the functionality of the third-party resource:
       communicating a request to a resource manager for allocation of the edge-compute resource to the client; and
       redirecting the client to the edge-compute resource to consume usage of the functionality of the third-party resource.

12. The method of claim 11, further comprising, prior to redirecting the client, configuring the edge-compute resource to perform the functionality of the third-party resource.

13. The method of claim 11, wherein determining whether the client is authorized to consume usage of the edge-compute resource associated with the third-party resource comprises:
    sending an edge resource authorization request to a policy server; and
    receiving a response from the policy server, wherein the response includes at least one of:
       a verification of the client's authorization to consume usage of the edge-compute resource;
       a denial of the client's authorization to consume usage of the edge-compute resource; and
       an enumeration of one or more functionalities that the client is authorized to consume.

14. The method of claim 11, wherein the policy is associated with a subscription for a particular service offered by an internet service provider, wherein the particular service provides subscribers of the service with automatic redirection of traffic to available edge-compute resources.

15. The method of claim 11, wherein prior to determining whether the client is authorized to consume usage of the edge-compute resource associated with the third-party resource, communicating with the resource manager for determining whether the edge-compute resource associated with the third-party resource is available.

16. The method of claim 15, wherein communicating with the resource manager for determining whether the edge-compute resource associated with the third-party resource is available comprises communicating with the resource manager for determining whether a resource set with particular functionalities of the third-party resource has been on-boarded.

17. The method of claim 11, wherein communicating the request to the resource manager for the allocation of the edge-compute resource to the client comprises at least one of:
communicating instructions to the resource manager to deploy a virtual network function (VNF) on a virtual resource operating on a physical resource in an optimized location in a network, wherein the VNF is configured to perform the functionality of the third-party resource; and
transitioning the VNF into a state such that it is configured to perform the functionality of the third-party resource for providing a service to the client.

18. A computer readable storage device that includes executable instructions which, when executed by a processor use a resource assignment server as part of:
receiving, from a client, a resource assignment request for a location of a third-party resource for directing the client to the third-party resource;
sending an edge resource authorization request to a policy server for determining whether the client is authorized to consume usage of an edge-compute resource, wherein the edge-compute resource is configured to perform a functionality of the third-party resource;
receiving a response from the policy server, wherein the response enumerates functionalities that the client is authorized to consume; and
when the response verifies the client's authorization to use the edge-compute resource for performing the functionality of the third-party resource:
communicating instructions to a resource manager for allocation of the edge-compute resource to the client; and
redirecting the client to the edge-compute resource to consume usage of the functionality of the third-party resource, wherein redirecting the client includes communicating a location of the edge-compute resource to the client.

19. The computer readable storage device of claim 18, wherein the allocation of the edge-compute resource to the client comprises at least one of:
communicating instructions to the resource manager to deploy a virtual network function (VNF) on a virtual resource operating on a physical resource in an optimized location in a network, wherein the VNF is configured to perform the functionality of the third-party resource; and
transitioning the VNF into a state such that it is configured to perform the functionality for service to the client.

20. The computer readable storage device of claim 18, wherein the resource assignment server is configured to communicate the location of the third-party resource or the location of the edge-compute resource to the client utilizing an established protocol including one of:
a Domain Name System (DNS) protocol; or
a Dynamic Host Configuration Protocol (DHCP).

* * * * *